(12) United States Patent  
Shigaki

(10) Patent No.: US 6,952,520 B1  
(45) Date of Patent: Oct. 4, 2005

(54) PICTURE RECORDER/REPRODUCER AND METHOD THEREOF

(75) Inventor: Satomi Shigaki, Tokyo (JP)

(73) Assignee: NEC Corporation, (JP)

( * ) Notice: Subject to any disclaimer, the term of this patent is extended or adjusted under 35 U.S.C. 154(b) by 912 days.

(21) Appl. No.: 09/655,524

(22) Filed: Sep. 5, 2000

(30) Foreign Application Priority Data

Sep. 6, 1999 (JP) .................................. 11-251801

(51) Int. Cl.[7] .............................. H04N 5/91; H04N 7/00
(52) U.S. Cl. ......................................... 386/46; 386/83
(58) Field of Search ............................... 386/46, 83, 95, 386/96, 104, 105, 106, 124, 125, 126, 45, 386/40, 39, 27, 33, 109, 111, 112, 1

(56) References Cited

U.S. PATENT DOCUMENTS 5,377,051 A * 12/1994 Lane et al. .................... 386/81

FOREIGN PATENT DOCUMENTS

| JP | 8-130700 | 5/1996 |
|----|----------|--------|
| JP | 8-163558 | 6/1996 |
| JP | 9-17128 | 1/1997 |
| JP | 11-69308 | 3/1999 |
| JP | 2000-125259 | 4/2000 |
| JP | 2000-152184 | 5/2000 |

* cited by examiner

Primary Examiner—Robert Chevalier  
(74) Attorney, Agent, or Firm—Dickstein, Shapiro, Morin & Oshinsky, LLP.

(57) ABSTRACT

According to the invention, as received stream data is analyzed a sequence header is retrieved and stream data after the detected sequence header is written to storage unit when a recording initiation command is received, a recorded file is generated with a sequence header having image format information required to reproduce stream data immediately after the recording initiation command at the head. As when a reproducing command is received, stream data after the sequence header is read from the storage unit and an image and voice are reproduced, the recorded stream data can immediately normally reproduced without delay and therefore, data acquired by recording stream data used for digital broadcasting and others can be smoothly reproduced.

7 Claims, 4 Drawing Sheets

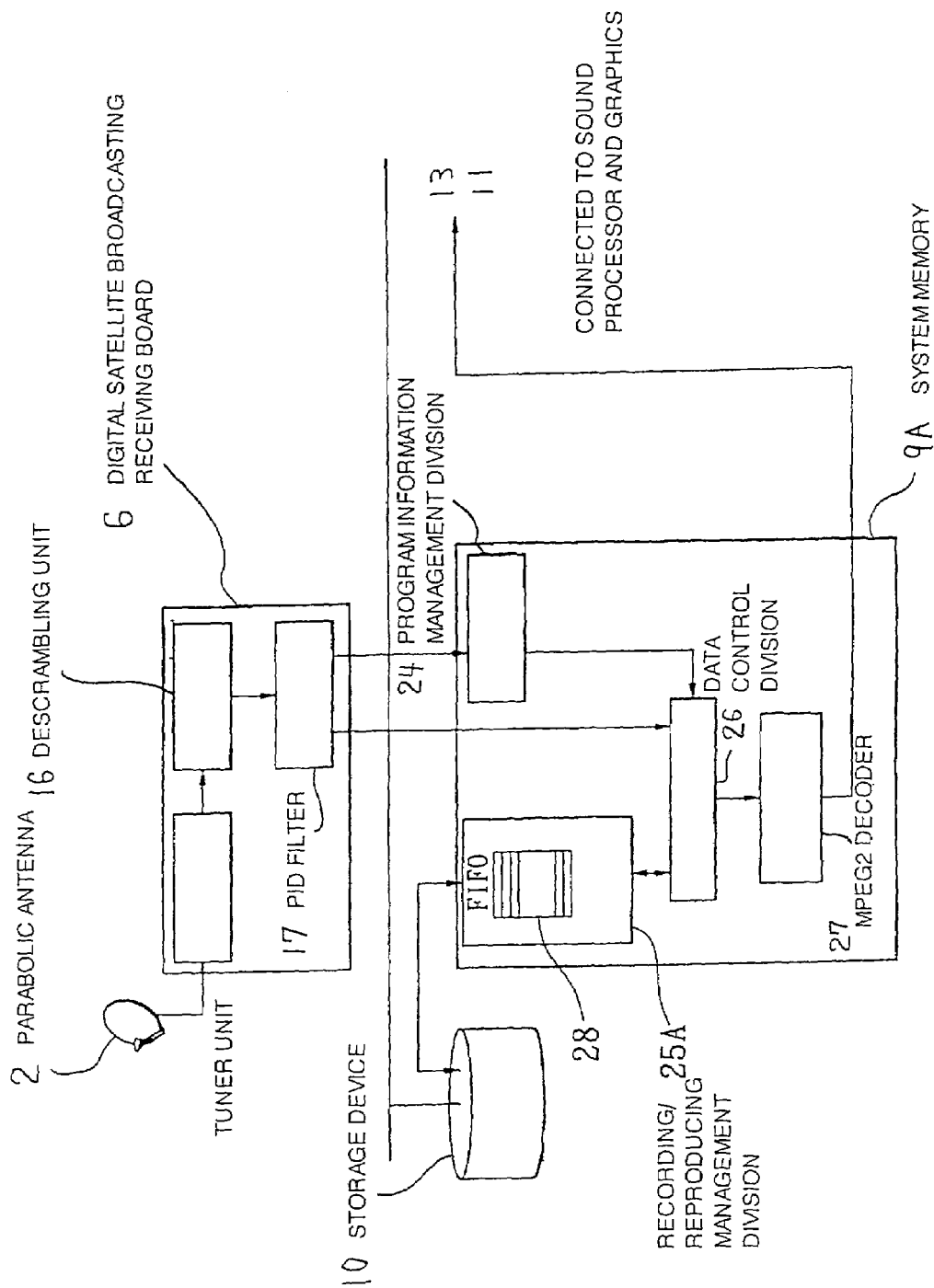

PICTURE RECORDER/REPRODUCER AND METHOD THEREOF

BACKGROUND OF THE INVENTION

1. Field of the Invention

The present invention relates to a picture recorder/reproducer and a method for recording stream data composed of compressed video/voice information and reproducing images and voice from recorded stream data.

2. Description of the Related Art

Digital broadcasting is started and has been able to be received by a personal computer. The capacity of a hard disk mounted in a personal computer has also increased. Then, it is conceivable that the opportunity to record and reproduce stream data used for digital broadcasting utilizing a personal computer will be increased in future.

In case stream data used for digital broadcasting is recorded, it is possible to record stream data in a storage device such as a hard disk since a user issues a recording initiation command.

When stream data is reproduced, data after a sequence header is normally reproduced by referring to the sequence header having image format information such as the size of an image and an image frame rate.

Therefore, in a conventional type recording/reproducing method, it is also possible to record stream data before the sequence header in a storage device since the recording of stream data is started at arbitrary time at which a user tries to record it, however, stream data without the sequence header is not normally reproduced and becomes noise.

Further, as stream data without a sequence header is also read as recorded data in reproducing, time loss occurs until data after a sequence header is output as normal video/voice data.

As for recording/reproducing stream data, heretofore, various techniques have been developed (refer to Japanese published unexamined patent applications No. Hei 8-130700, No. Hei 9-17128 and No. Hei 11-69308 for example), however, there is no patent application in which improvement is tried from such a viewpoint.

As described above, in the conventional type recording/reproducing method, stream data in a period since a recording initiation command is issued until the next sequence header emerges is not only normally reproduced even if the stream data is recorded but there is a problem that time loss occurs until normal reproduction is enabled.

SUMMARY OF THE INVENTION

Object of the Invention

The invention is made in view of the situation described above and the object is to provide a recorder/reproducer and a method whereby normal images and voice can be output immediately after reproducing by recording stream data after a sequence header immediately after or before a recording initiation command is issued.

SUMMARY OF THE INVENTION

In the invention, as received stream data is analyzed when a recording initiation command is issued, a sequence header is retrieved and stream data after the detected sequence header is written to storage means, a recorded file is generated with a sequence header having image format information required to reproduce stream data immediately after the recording initiation command at the head.

As the stream data after the sequence header is read from the storage means and images and voice are reproduced when a reproducing command is issued, the recorded stream data can be immediately normally reproduced without delay and therefore, data acquired by recording stream data used for digital broadcasting and others can be smoothly reproduced.

Also, in the invention, as received stream data is stored in an FIFO memory, a sequence header immediately before a recording initiation command in the stream data stored in the FIFO memory is retrieved when the recording initiation command is issued and the stream data after the detected sequence header is written to storage means, a recorded file is generated with a sequence header having image format information required to reproduce the stream data immediately before the recording initiation command at the head.

As the stream data after the sequence header is read from the storage means and images and voice are reproduced when the reproducing command is issued, the stream data since the recording initiation command can be immediately normally reproduced without loss and therefore, data acquired by recording stream data used for digital broadcasting and others can be smoothly reproduced.

BRIEF DESCRIPTION OF THE DRAWINGS

FIG. 4 is an explanatory drawing for explaining data processing in a recorder/reproducer equivalent to a second embodiment.

DETAILED DESCRIPTION OF THE PREFERRED EMBODIMENTS

Figure 1:
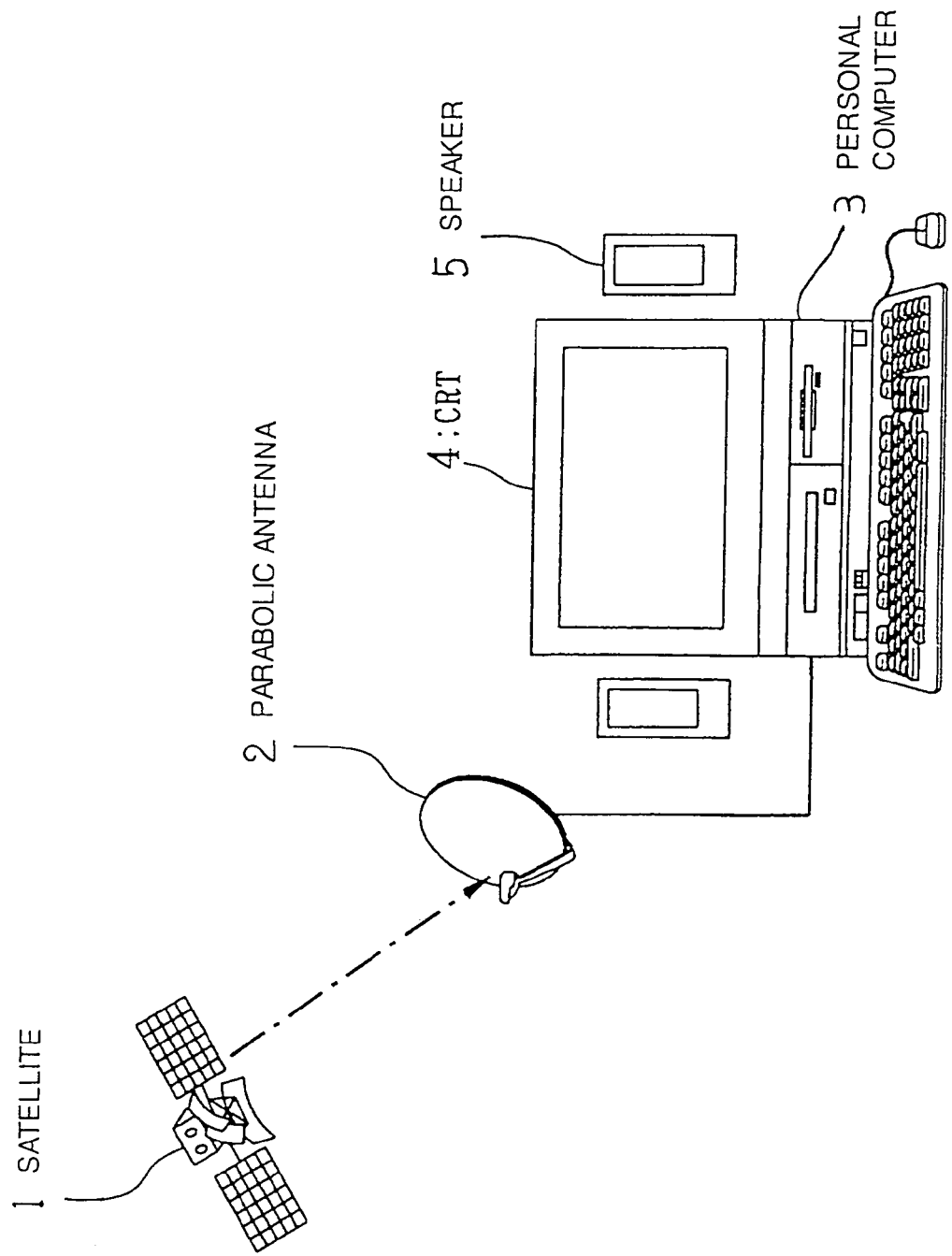
FIG. 1 shows the configuration of a digital satellite broadcasting receiving system.

Referring to the drawings, embodiments of the invention will be described below. The description will be concretely made using the embodiments.

First, referring to FIG. 1, an example of the configuration of a system according to the invention will be described. FIG. 1 shows the configuration of a digital satellite broadcasting receiving system by a personal computer.

The digital satellite broadcasting receiving system according to the invention is substantially composed of a parabolic antenna 2, a personal computer 3, CRT 4 and a speaker 5.

The parabolic antenna 2 receives a digital satellite broadcasting radio wave from a satellite 1. The personal computer 3 executes processing for receiving the digital satellite broadcasting radio wave received via the parabolic antenna 2 and outputs a picture signal and an aural signal. CRT 4 displays an image based upon the picture signal output from the personal computer 3. The speaker 5 transmits voice based upon the aural signal output from the personal computer 3.

The operation of the digital satellite broadcasting receiving system shown in FIG. 1 will be described below.

A program broadcast by a radio signal from the satellite 1 is received via the parabolic antenna 2, required receiving processing is executed by the personal computer 3, an acquired picture output signal is displayed on CRT 4 and an aural output signal is transmitted from the speaker 5.

Next, an embodiment of the recording/reproducing processing of stream data executed in the personal computer 3 shown in FIG. 1 will be described in detail.

For an example of stream data dealt in the invention, the case of stream data according to a moving picture experts group (MPEG)2 standardized in International Organization for Standardization (ISO) 13818-1 used for digital satellite broadcasting will be described below.

Stream data according to MPEG2 is hierarchized by a transport stream (TS) packet in units of 188 bytes and a packeted elementary stream (PES) packet in which plural transport stream (TS) packets are multiplexed.

Identification (ID) information to distinguish and manage the information of a packet exists every TS packet except the payload of transmitted information. ID of a packet is called a packet identifier (PID) and PID corresponding to the video information of an image, the audio information of voice and program information is respectively defined every channel in digital satellite broadcasting.

Also, a sequence header to transmit image format information such as the size of an image and an image frame rate is inserted at the head of a PES packet every plural PES packets.

Figure 2:
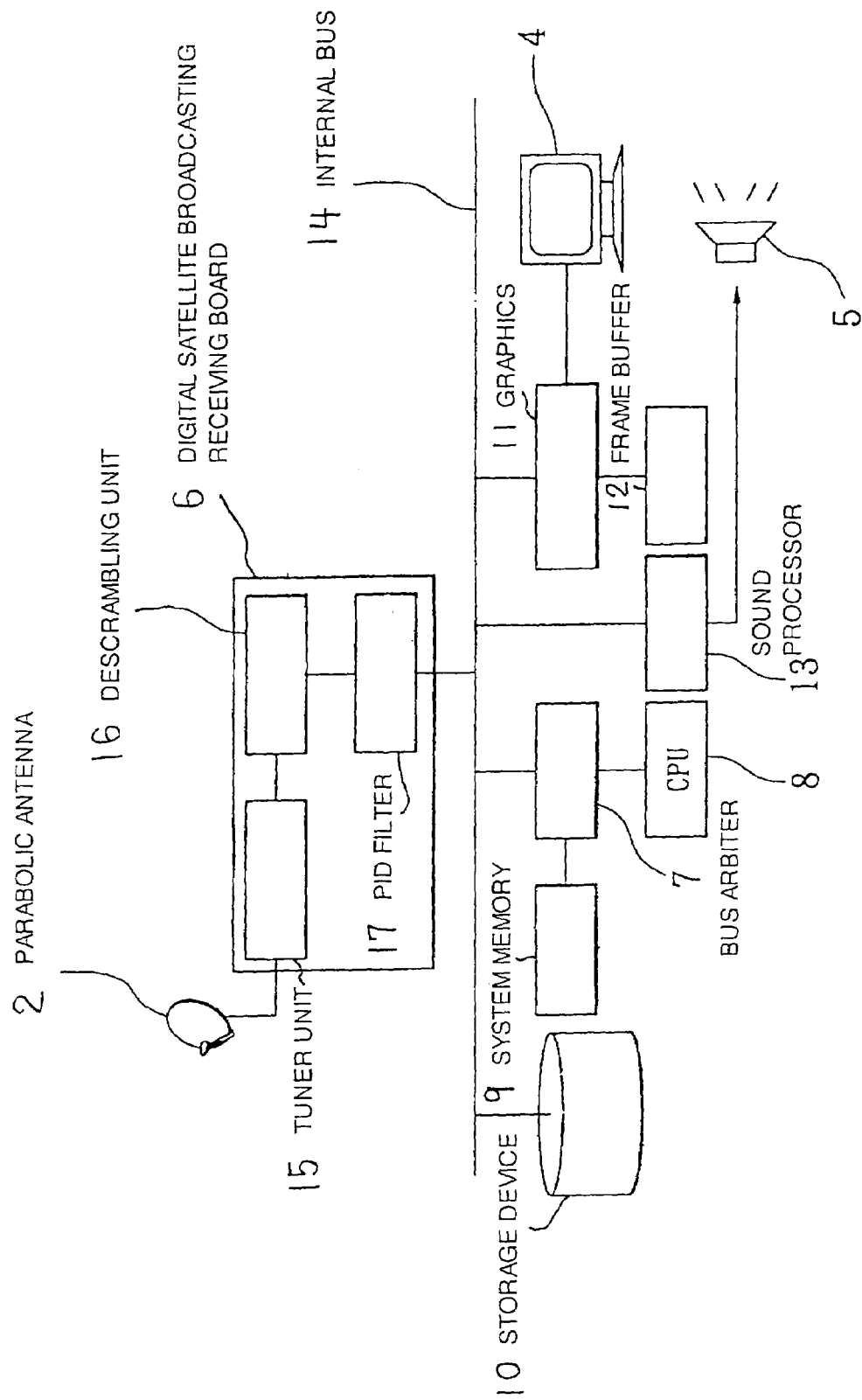
FIG. 2 is a block diagram showing the configuration of a recorder/reproducer equivalent to a first embodiment of the invention.
Figure 3:
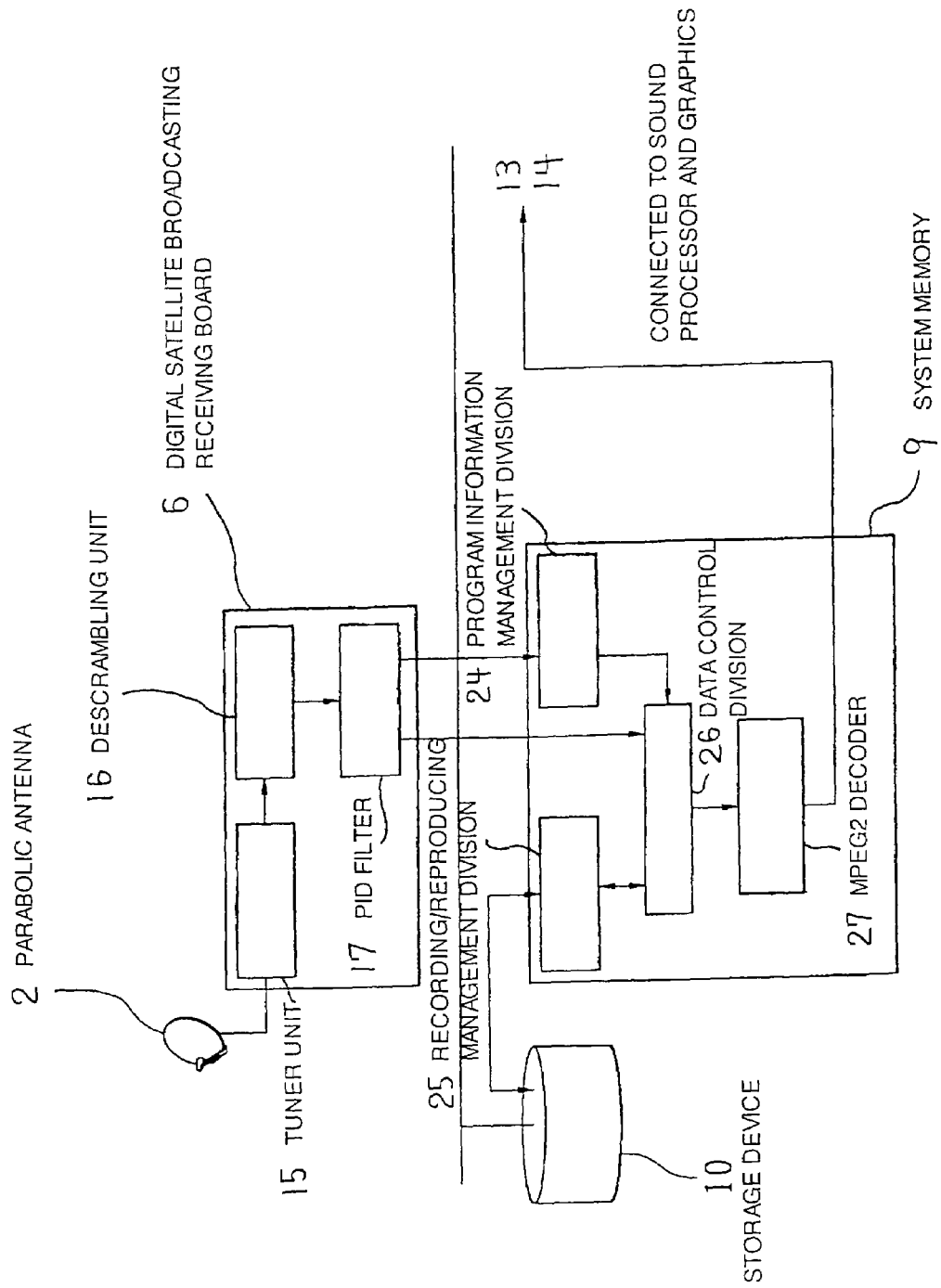
FIG. 3 is an explanatory drawing for explaining data processing in the first embodiment.

FIG. 2 is a block diagram showing the configuration of a recorder/reproducer equivalent to a first embodiment of the invention and FIG. 3 explains data processing in this embodiment. The recorder/reproducer in this embodiment is substantially composed of a parabolic antenna 2, a digital satellite broadcasting receiving board 6, a bus arbiter 7, CPU 8, a system memory 9, a storage device 10, graphics 11, a frame buffer 12, a sound processor 13 and an internal bus 14 as shown in FIG. 2. Further, the digital satellite broadcasting receiving board 6 is composed of a tuner unit 15, a descrambling unit 16 and a PID filter 17.

The digital satellite broadcasting receiving board 6 is mounted inside the personal computer 3, is controlled by CPU 8 via the internal bus 14, processes a radio wave from the satellite received via the parabolic antenna 2 and outputs a picture signal and an aural signal.

In the digital satellite broadcasting receiving board 6, the tuner unit 15 demodulates a radio wave received via the parabolic antenna 2, executes processing for error correction and executes processing for extracting a TS data signal.

The descrambling unit 16 releases cipher for receiving paid broadcasting and others in TS data extracted from the tuner unit 15. The PID filter 17 monitors PID existing in a TS packet the cipher of which is released by the descrambling unit 16 and passes only a TS packet having the specified PID to the internal bus 14 as TS data.

The bus arbiter 7 controls access from CPU 8 to the system memory 9, access to each device connected to the internal bus 14 and a request for using the internal bus 14 from each device connected to the internal bus 14. CPU 8 controls the digital satellite broadcasting receiving board 6, the input/output of data to/from the storage device 10 and the transfer and others of display data to the graphics 11.

The system memory 9 stores a program and data for CPU 8 to control the whole personal computer 3. The storage device 10 stores received TS data, program information and others.

The graphics 11 controls the writing, modifying and reading of video data to display on CRT 4 to/in/from the frame buffer 12. The frame buffer 12 has a memory to store data for displaying on CRT 4 and data required to control the graphics 11.

The sound processor 13 converts an aural signal from an external device from analog to digital, transfers it to the system memory 9, converts aural data for output stored in the system memory 9 from digital to analog and executes processing for outputting it from the speaker 5. The internal bus 14 mutually connects the digital satellite broadcasting receiving board 6, the bus arbiter 7, the storage device 10, the graphics 11 and the sound processor 13.

Next, referring to FIG. 3, the features of a program stored in the system memory 9 in this embodiment will be described. The configuration and feature of the parabolic antenna 2, the digital satellite broadcasting receiving board 6, the system memory 9 and the storage device 10 respectively shown in FIG. 3 are similar to those shown in FIG. 2.

A program for realizing a recording/reproducing feature stored in the system memory 9 is composed of a program information management division 24, a recording/reproducing management division 25, a data control division 26 and an MPEG2 decoder 27.

The program information management division 24 receives program information from the digital satellite broadcasting receiving board 6, analyzes the program information, manages whether recording is to be made or not, generates a program schedule, informs a user of the program information, further informs the data control division 26 of it in case a user issues a command for recording and reproducing the recorded data and instructs the data control division to be operated under the control of the user. The recording/reproducing management division 25 analyzes TS data received from the data control division 26 in recording, executes processing for retrieving a sequence header, writes TS data having the detected sequence header at the head to the storage device 10, writes program information to the storage device, retrieves a data file to be reproduced from the program information stored in the storage device 10 in reproducing, reads recorded data and passes it to the data control division 26.

The data control division 26 sends TS data received from the digital satellite broadcasting receiving board 6 to the recording/reproducing management division 25 and the MPEG2 decoder 27 when a recording instruction is received from the program information management division 24 and instructs the recording/reproducing management division 25 to read specified recorded data when a reproducing instruction is received. The MPEG2 decoder 27 decodes the TS data received from the data control division 26, sends the output of an image to the graphics 11 and sends the output of voice to the sound processor 13.

Referring to FIGS. 1, 2 and 3, the operation of the recorder/reproducer in this embodiment will be described below.

In case digital satellite broadcasting is received, first, a channel for a user to receive is selected. Hereby, the program information management division 24 acquires the frequency information of a radio wave to receive the channel selected by the user and sets a received frequency in the tuner unit 15. Next, the program information management division 24 sets PID required to receive a program selected by the user and PID for acquiring information required to receive broadcasting such as program information in the PID filer 17. Hereby, the compressed data of an image and voice and program information are received from the PID filter 17 in the format of a packet corresponding to the specified PID.

In recording, a command for recording from a user is transmitted to the program information management division 24. As there is the limit of recording depending upon a program, TS data is recorded only in the case of a recordable program. Concretely, the program information management division 24 manages the information of a program, analyzes whether a program selected by a user is a recordable program or not, analyzes information such as program information in the case of the recordable program and generates data to inform the user of whether recording is enabled or not. In case recording is prohibited, the program information management division controls so that a user cannot perform recording operation in future.

The data control division 26 receives TS data from the PID filter 17. The data control division 26 sends TS data to both the recording/reproducing management division 25 and the MPEG2 decoder 27 according to an instruction for recording from the program information management division 24.

The recording/reproducing management division 25 analyzes TS data received from the data control division 26, retrieves a sequence header and writes the TS data having the detected sequence header at the head to the storage device 10 when the sequence header is found.

As image format information such as video data size and an image frame rate which the sequence header has is required in reproducing TS data to write the sequence header to the storage device 10, an image and voice can be immediately normally output in reproducing recorded data by putting sequence header information at the head of a recorded file and the smooth reproduction of recorded TS data can be realized by removing time loss until normal output is performed.

The recording/reproducing management division 25 also writes program information for management except the TS data to the storage device 10 in recording.

Simultaneously, the MPEG2 decoder 27 decodes TS data received from the data control division 26 and generates video data and voice data. As the generated video data is displayed on CRT 4 as an image via the graphics 11 and voice data is transmitted from the speaker 5 as voice via the sound processor 13, the data control division 26 instructs the recording/reproducing management division 25 to read the recorded data of a program to be reproduced according to a reproducing command from a user in reproducing the recorded data an image and voice in which can be also monitored during recording. Hereby, the recording/reproducing management division 25 retrieves a data file to be reproduced from program information for management stored in the storage device 10, reads TS data from the data file and passes it to the data control division 26. The data control division 26 sends the TS data to the MPEG2 decoder 27.

The MPEG2 decoder 27 decodes TS data received from the data control division 26 and generates video data and voice data. As the generated video data is displayed on CRT 4 as an image via the graphics 11 and voice data is transmitted from the speaker 5 as voice via the sound processor 13, a user can view and listen to a recorded image and recorded voice.

As described above, according to the recorder/reproducer equivalent to this embodiment, as a recorded file is generated with the sequence header having image format information required to reproduce stream data at the head immediately after a recording command when the stream data is recorded, recorded stream data can be immediately normally reproduced without time loss in reproducing and data acquired by recording stream data used for digital broadcasting and others can be smoothly reproduced.

In the first embodiment, after a user issues a recording initiation command, the recording/reproducing management division 25 analyzes TS data sent from the data control division 26 and retrieves the sequence header having image format information immediately after the recording initiation command. The recording/reproducing management division records TS data after the detected sequence header in the storage device 10. Therefore, a reproduced image and voice may be later than when the recording initiation command is issued.

In the meantime, a system in which an image and voice can be reproduced without delay since a recording initiation command is issued by always sending TS data from the data control division 26 to MPEG2 decoder 27 for reproduction, sending it to the recording/reproducing management division 25 for the preparation of recording, all buffering TS data sent from the data control division 26 by providing an FIFI memory in the recording/reproducing management division 25 and recording the buffered TS data with a sequence header immediately before the recording initiation command at the head when the recording initiation command is issued is conceivable.

Such another embodiment of the invention will be described below.

FIG. 4 is an explanatory drawing for explaining data processing in a recorder/reproducer equivalent to a second embodiment of the invention.

The whole configuration of the recorder/reproducer equivalent to this embodiment is different from that in the first embodiment only in that a system memory 9A is provided in place of the system memory 9 shown in FIG. 2 in the first embodiment.

Referring to FIG. 4, the features of a program stored in the system memory 9A in this embodiment will be described below. The configuration and feature of a parabolic antenna 2, a digital satellite broadcasting receiving board 6 and a storage device 10 respectively shown in FIG. 4 are similar to those in the embodiment shown in FIG. 2.

A program for realizing a recording/reproducing feature in the system memory 9A is composed of a program information management division 24, a recording/reproducing management division 25A, a data control division 26 and an MPEG2 decoder 27. Of these, the features of the program information management division 24, the data control division 26 and the MPEG2 decoder 27 are similar to those in the first embodiment shown in FIG. 3.

The recording/reproducing management division 25A is provided with a First In First Out (FIFO) memory 28 in addition to being provided with the feature of the recording/reproducing management division 25 shown in FIG. 3.

The FIFO memory 28 is provided with a feature for writing data first-in and reading data first-out.

Referring to FIGS. 1, 2 and 4, the operation of the recorder/reproducer in this embodiment will be described below mainly based upon points different from those in the first embodiment.

The recording/reproducing management division 25A buffers all TS data sent from the data control division 26 in the FIFO memory 28. At this time, the FIFO memory 28 shall have capacity equivalent to an interval between sequence headers in stream data so that one sequence header is necessarily included in the stored information.

When a recording command is received from a user, the recording/reproducing management division 25A analyzes TS data buffered in the FIFO memory 28 and retrieves a sequence header. The recording/reproducing management division writes TS data after the detected sequence header to the storage device 10.

When a reproducing command is received from a user, the recording/reproducing management division reads TS data from the storage device 10 as in the first embodiment and the MPEG2 decoder 27 executes reproducing processing.

As TS data when a user issues a recording command is recorded and reproduced with a sequence header immediately before it at the head by doing as described above, video data which the user desires can be recorded and reproduced without a deficiency since the recording command is issued.

As described above, according to the recorder/reproducer equivalent to this embodiment, as a recorded file is generated with a sequence header having image format information required to reproduce stream data immediately before a recording initiation command at the head when the stream data is recorded, the stream data can be immediately normally reproduced without a deficiency since the recording initiation command is issued in reproducing and therefore, data acquired by recording the stream data used for digital broadcasting and others can be smoothly reproduced.

As in the second embodiment, recorded TS data is data stored in the FIFO memory 28 since before a user issues a recording initiation command, an image before the recording initiation command may be also reproduced when the recorded TS data is reproduced as it is.

In the meantime, to also precisely reproduce an image which a user views when a user issues a recording initiation command, the following steps have only to be taken. That is, each position of video data and voice data respectively corresponding to an output image and output voice when a user issues a recording initiation command is stored in a positional storage not shown and when a user issues a reproducing command, reproducing processing is applied to TS data after a sequence header read from the storage device 10, however, an image and voice are not output. An image is actually output on CRT 4 and voice is output from the speaker 5 from each position stored in the positional storage of output video data and output voice data when the user issues the recording initiation command.

Referring to the drawings, the embodiments of the invention have been described above in detail, however, the concrete configuration is not limited to the embodiments and even if design is varied in a range which does not deviate from the outline of the invention, the variation is also included in the invention. For example, the capacity of the FIFO memory 28 in the second embodiment is not limited to capacity equivalent to an interval between sequence headers, one or more sequence headers may be also included and in this case, one sequence header immediately before recording is started has only to be retrieved in recording. Also, the invention can be applied to a digital broadcasting receiving system of digital ground wave broadcasting and digital community antenna television (CATV) broadcasting by changing the tuner unit 15 to a digital ground wave tuner unit and a digital CATV tuner unit. Further, the invention can be applied to the picture recording and reproducing of the whole stream data without limiting to TS data.

As described above, according to the recorder/reproducer according to the invention, as a recorded file is generated with a sequence header having an image format required to reproduce stream data at the head when the stream data is recorded, the recorded stream data can be immediately normally reproduced and therefore, data acquired by recording stream data used for digital broadcasting and others can be smoothly reproduced.

What is claimed is:

1. A recorder/reproducer for receiving stream data and recording it in storage means and for reading the recorded stream data and reproducing it, wherein:
when a recording initiation command is received, received stream data is analyzed, a sequence header immediately after the recording initiation command is retrieved, stream data after the detected sequence header is written to said storage means; and
when a reproducing command is received, the stream data after said sequence header is read from said storage means and an image and voice are reproduced.

2. A recorder/reproducer for receiving stream data and recording it in storage means and for reading the recorded stream data and reproducing it, wherein:
when receiving stream data is stored in an FIFO memory and a recording initiation command is received, a sequence header immediately before said recording initiation command in stream data in said FIFO memory is retrieved and stream data after the detected sequence header is written to said storage means; and
when a reproducing command is received, stream data after said sequence header is read from said storage means and an image and voice are reproduced.

3. A recorder/reproducer according to claim 2, wherein:
said FIFO memory has capacity for storing stream data having data length equal to an interval between sequence headers.

4. A recorder/reproducer according to claim 2, wherein:
said FIFO memory has capacity for storing stream data having data length equal to or longer than an interval between sequence headers; and
when a recording initiation command is received, a sequence header immediately before said recording initiation command in stream data in said FIFO memory is retrieved.

5. A recorder/reproducer according to any of claims 2 to 4, wherein:
positional storage means for storing each position of video data and voice data corresponding to an output image and output voice when a recording initiation command is received is provided; and
when a reproducing command is received, reproducing processing is applied to stream data after said sequence header in said storage means and an image and voice are output from each position of video data and voice data respectively stored in said positional storage means.

6. A recording/reproducing method for receiving stream data and recording it and for reading the recorded stream data and reproducing it, wherein:
when a recording initiation command is received, received stream data is analyzed, a sequence header immediately after the recording command is retrieved and stream data after the detected sequence header is stored; and
when a reproducing command is received, stream data after said stored sequence header is read and an image and voice are reproduced.

7. A recording/reproducing method for receiving stream data and recording it and for reading the recorded stream data and reproducing it, wherein:
when received stream data is stored in an FIFO memory and a recording initiation command is received, a sequence header immediately before said recording initiation command in stream data stored in said FIFO memory is retrieved and stream data after the detected sequence header is stored; and
when a reproducing command is received, stream data after said stored sequence header is read and an image and voice are reproduced.

* * * * *